United States Patent [19]

Nicholas et al.

[11] 4,143,884
[45] Mar. 13, 1979

[54] SEALING MEMBER FOR SPIGOT-AND-SOCKET PIPE COUPLING

[75] Inventors: Terry G. Nicholas, Twford, United Kingdom; Albertus A. Oostenbrink, Hardenberg, Netherlands

[73] Assignee: Wavin B.V., Zwolle, Netherlands

[21] Appl. No.: 825,063

[22] Filed: Aug. 16, 1977

[30] Foreign Application Priority Data

Aug. 18, 1976 [NL] Netherlands .................. 76 09192

[51] Int. Cl.² .................. F16L 21/04; F16J 15/10; F16J 15/32
[52] U.S. Cl. .................. 277/207 A; 277/208; 277/168; 285/110; 285/231; 285/DIG. 22
[58] Field of Search .......... 277/207 A, DIG. 2, 208, 277/110, 111, 168, 170, 206 R, 186, 212 R, 182; 285/231, 345, DIG. 22, 379, 110

[56] References Cited

U.S. PATENT DOCUMENTS

| B 313,280 | 4/1976 | Schuldink ............... 285/110 |
| --- | --- | --- |
| 2,271,777 | 2/1942 | Nathan ............... 277/207 A X |
| 2,882,073 | 4/1959 | James ............... 277/208 X |
| 2,994,571 | 8/1961 | Peras ............... 277/208 X |
| 3,163,432 | 12/1964 | De Boer ............... 285/110 X |
| 3,498,623 | 3/1970 | Rowe ............... 277/207 A X |
| 3,595,587 | 7/1971 | Senigalliesi ............... 308/187.2 X |
| 3,843,141 | 10/1974 | Kuhn ............... 123/193 CH X |
| 3,857,589 | 12/1974 | Oostenbrink ............... 277/207 A X |

FOREIGN PATENT DOCUMENTS

| 530016 | 7/1931 | Fed. Rep. of Germany ........... 285/231 |
| --- | --- | --- |
| 2423388 | 12/1974 | Fed. Rep. of Germany ...... 277/207 A |
| 2165518 | 3/1973 | France ............... 285/110 |
| 2269670 | 11/1975 | France ............... 285/110 |
| 7206614 | 11/1973 | Netherlands ............... 285/110 |
| 1116951 | 6/1968 | United Kingdom ............... 285/110 |
| 1133412 | 11/1968 | United Kingdom ............... 285/110 |

*Primary Examiner*—Robert S. Ward, Jr.
*Attorney, Agent, or Firm*—Wilkinson, Mawhinney & Theibault

[57] ABSTRACT

Sealing member for a spigot and socket coupling, comprising a retaining part, a sealing part extending with two steps within the space bound by the inner circumference of the retaining part and of the extension thereof and a connecting part interconnecting the retaining part and the sealing sleeve. At any point between the junction with the retaining part and the free end of the sealing sleeve, the thickness of the sealing member is not greater than the thickness of the part extending between said point and said junction. The thickness does not exceed the thickness of the sealing member at said junction.

The inner side of the steps of the sealing member are provided with leakage-preventing ribs and the retaining part is substantially perpendicular to the connecting part, whilst the first step of the sealing sleeve is situated within the inner side of the retaining part. The end of the sleeve is provided with a tapered lip forming preferably a sort of sickle with the sealing member.

47 Claims, 5 Drawing Figures

SEALING MEMBER FOR SPIGOT-AND-SOCKET PIPE COUPLING

BACKGROUND OF THE INVENTION

Our invention concerns improvements in or relating to pipe couplings and more particularly a sealing member for a spigot and socket coupling.

A sealing member for such a coupling, comprising a retaining part, a sealing part, and a connecting part interconnecting the retaining part and the sealing part has been proposed. The retaining part is clamped between the end of the socket and a retaining ring fixed to the socket so that the sealing part is able to effect a seal between the socket and a spigot when the latter is inserted thereinto. The connecting part of the prior proposed sealing member forms a narrowed neck portion between the retaining and sealing parts of the sealing member and cracks may occur at the neck portion. The cracks may eventually cause the retaining part to loosen itself from the sealing part thereby considerably impairing sealing.

SUMMARY OF THE INVENTION

The present disclosure is directed to a sealing member for a spigot and socket coupling, comprising a retaining part, a sealing part and a connecting part interconnecting the retaining and the sealing parts, the sealing part extending stepwise within the space bound by the inner circumference of the retaining part and the extension thereof, and at any point between the junction with the retaining part and the free end of the sealing part the thickness of the sealing member does not exceed the thickness of the part extending between said point and said junction and does not exceed the thickness of the sealing member at said junction.

Thus, the invention eliminates the narrowed neck portion of the prior proposal and the abovementioned disadvantages thereof to be eliminated.

The sealing member may have the same thickness throughout its length from the junction with the retaining part to the sealing part and this thickness may be the same as the thickness of the sealing part at the junction where it is connected with the connecting part. In such an arrangement the sealing member may also have the same thickness throughout its length, whereby the connecting and sealing parts have the same strength along their entire lengths.

The thickness of the sealing member may decrease gradually from the junction with the retaining part. In such an arrangement, the decrease in thickness in the sealing member may be continued to the free end of the sealing part. This gradual decrease in the thickness of the sealing member further assists the prevention of cracks occurring in the connecting part when the spigot is slid into the socket.

The stepwise configuration provides an excellent sealing due to at least two zones where each of the spigot and of the socket sealingly engage the sealing member, said zones being separated by free parts of the socket and spigot.

The inner side of the sealing part is disposed radially inwardly of the inner side of the connecting part. The sealing member comprises preferably a plurality of steps, more preferably at least two steps. Advantageously a first step is substantially situated within the inner side of the retaining part. In a preferred embodiment, the retaining part is substantially perpendicular to the connecting part. Adventageously the sealing part comprises a bent part connecting a first and second step of the sealing member.

It has been found that such arrangements provide the sealing member with good strength characteristics and provide excellent sealing even in hot water proofs. It is particularly advisable that the sealing part has a circular cross section in the region which should cooperate with the spigot, while when the aforementioned measures are combined a cooperation between the sealing member and the spigot is achieved at at least two locations which assists in producing optimal sealing in the pipe coupling, also under less than optimal circumstances or changing circumstances which may arise after a lapse of time.

According to a very preferred embodiment of a pipe connection the sealing member engages the socket at three separate zones and the spigot at two separate zones, at least one of said zones being situated at the free end of a socketspace.

Preferably the sealing member is formed of a resilient material such as a rubber.

The invention also includes a pipe coupling comprising a spigot and a socket in combination with the sealing member.

SURVEY OF THE DRAWINGS

DESCRIPTION OF A PREFERRED EMBODIMENT

Figures 1, 2:
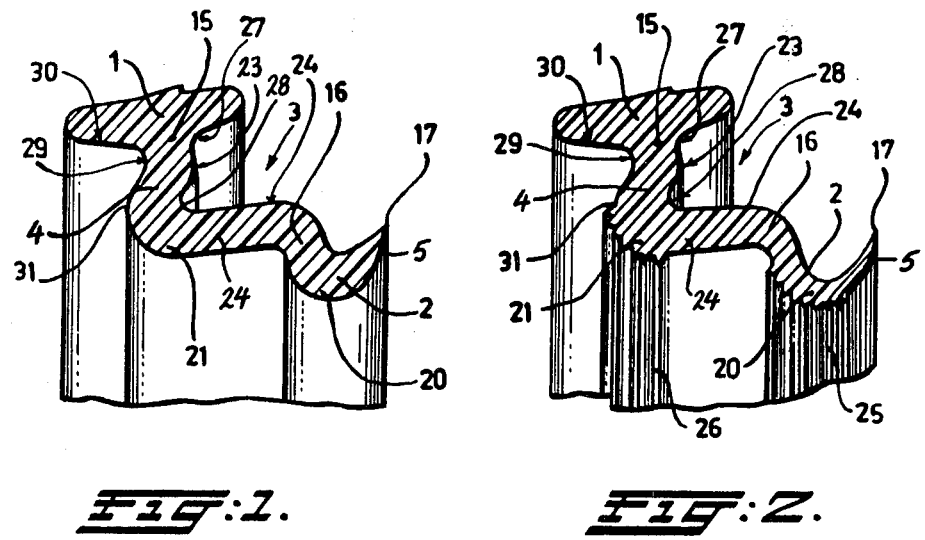
FIG. 1 is a fragmentary transverse cross-section of a sealing member.
FIG. 2 is a fragmentary transverse cross-section of a modified form of sealing member.
Figure 5:
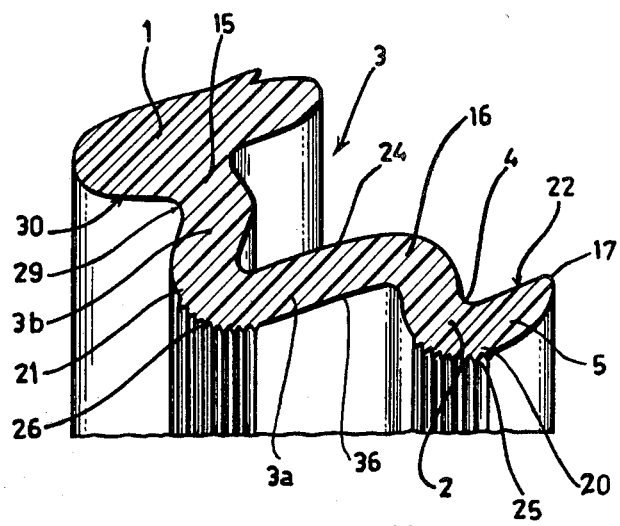
FIG. 5 is a fragmentary transverse cross-section of the sealing member of FIG. 1 showing a modified form of sealing member.

Each of FIGS. 1, 2 and 5 show a respective annular sealing member 3 for a spigot and socket coupling. Each of the sealing members is formed of a resilient material such as a rubber and comprises a retaining part 1, a sealing part, comprising a first step 24 of sealing part and second step 2 of sealing part, and a connecting part 4 which interconnects the retaining and sealing parts at the first junction 15.

The sealing part extends stepwise with steps 2 and 24 within the space bound by the inner circumference of the retaining part 1 and the extension thereof.

Step 2 is connected with step 24 through curved bent transition part or second junction 16.

The thickness of the sealing member is substantially the same from junction 15 to at least the end of the first step 24, in FIG. 1 which means the end of the first sealing part 3a.

Thus in FIG. 1 the thickness of the connecting part 3b from the junction 15 with the retaining part 1 is always substantially equal to the thickness of the first sealing part 3a at the point where it is connected with the connecting part 3b and there are no neck portions in the connecting part 3b of sealing member 3.

In the FIGS. 1, 2 and 5 the sealing member is tapered at its free end 17; however the sealing member may have the same thickness throughout its length (not illustrated) from the first junction 15 with the retaining part 1.

The thickness of the sealing member as shown in FIG. 2 decreases gradually from the first junction 15 to the junction 16 whereupon the decrease of thickness is continued in a gradual way via the first and second sealing parts 3a and 2 to the free end 17 thereof.

According to FIG. 5 the sealing member has the same thickness from junction 15 to sealing part 2, said sealing part 2 being provided with a tapered end 17 presenting a substantially flat surface 22 extending in the cross-section from tapered end 17 towards second step 4.

In the embodiments at least one, preferably a plurality of, leakage-preventing annular ribs 25 are on the curved surface 20 engaging a spigot in a pipe coupling. Similar ribs 26 may be or are provided on the surface 21 of the sealing member also engaging the spigot. It is obvious that one or both surfaces 20 and 21 may be provided with said ribs.

The connecting part 3b may be a straight part, but as shown in the FIGS. 1, 2 and 5 it is advantageous to provide the inner side of connecting part 3b with a wave crest 23 and at both sides thereof wave valleys 27 and 28. The outer side of connecting part 3b is now provided with a corresponding wave valley 29 facing the wave crest 23 on the other side in order to meet the requirement of an even or decreasing thickness of the connecting part 3b.

The sealing part 2 of the sealing member has the shape of a sickle.

Figure 3:
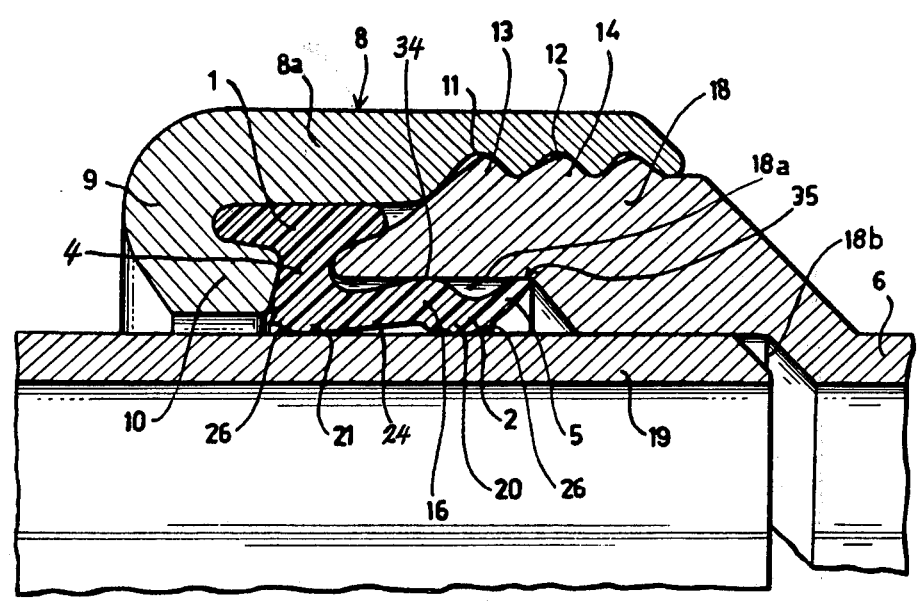
FIG. 3 is a fragmentary longitudinal cross-section of a pipe coupling included the sealing member shown in FIG. 1.

FIG. 3 shows a pipe coupling comprising a pipe 6 with a widened socket 18 which on its outer side has undulations or ribs 13 and 14, the socket 18 co-operating with a clamping or retaining ring 8. The clamping ring comprises an outer leg portion 8a secured to the outer side of the socket, a connection portion 9, and an adjoining end portion 10. The inside diameter of the portion 10 of the retaining ring 8 is slightly larger than the outside diameter of the spigot 19 of the coupling.

For properly securing the clamping ring 8 in position this ring is provided with undulations 11 and 12, which co-operate with the undulations 13 and 14 on the socket 18 to enable the ring 8 to be snap-fitted to the socket.

According to a preferred embodiment the undulations 11, 12, 13 and 14 are shaped such that the ring may slide over the outer side of the socket undulations during impact.

The retaining part 1 of the sealing member is accommodated between the ring 8 and the socket 18 in the space delimited by the leg 8a, connecting portion 9 and portion 10 of the retaining ring and the free end portion 5 of the socket 18.

As is seen in FIGS. 1, 2 and 5, the distance from the inner side 20 of the sealing part to the axis (not shown) of the sealing member is smaller than the distance from the axis to the inner side 21 of the adjoining part of the sealing member. That is, the inner side 20 is disposed radially inwardly of the inner side 21.

A first step 24 of sealing part 3a of the sealing means adjoins connecting part 4, the first step 24 of sealing part 3a extending substantially perpendicular to the connecting part 4.

This design enables the forces exerted on the connecting part when the spigot 19 is slid into the socket 18 to be as small as possible.

In order to obtain a proper sealing, the sealing part has a circular cross-section in the region 20 which co-operates with the spigot, in use.

Therefore on the one hand the sealing part 2 co-operates sealingly at surface 20 with the spigot 19 and on the other hand, due to the deformation of the sealing member when a spigot 19 is introduced, a second proper sealing is achieved at a further location formed by surface 21. It will be noted that the retaining part 1 is substantially perpendicular to the connecting part 3b. This increases its effectiveness and assists in absorbing tensile forces.

Figure 4:
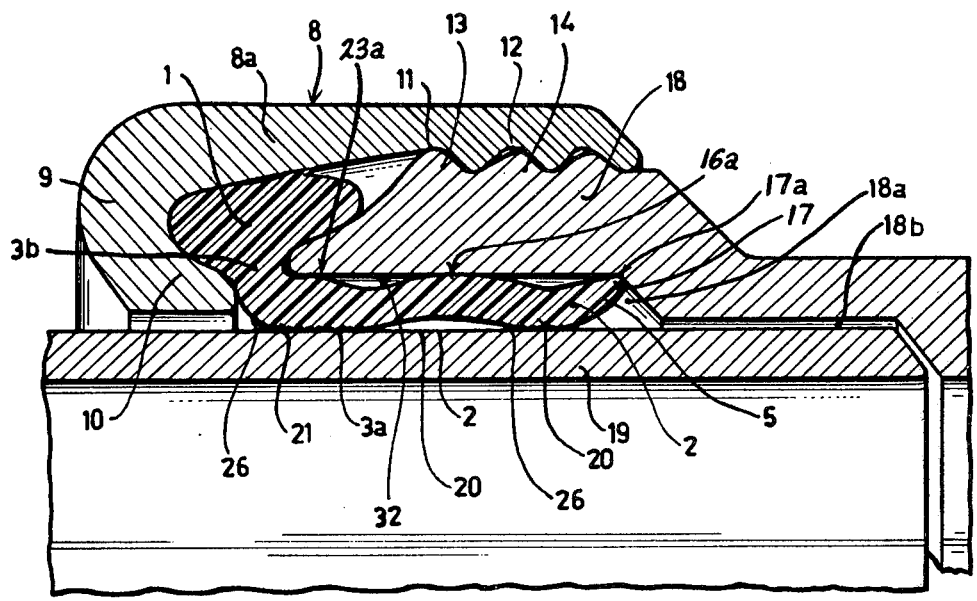
FIG. 4 is a further embodiment showing longitudinal section similar to FIG. 3.

FIG. 4 shown another preferred embodiment of a pipe coupling similar to FIG. 3 with a sealing member according to FIG. 5. The only difference is that a third part 23a of the sealing member engages the inner wall 32 of socket 8a. In this way the sealing member 3b engages the inner wall 32 of socket part 8a through a second part 16a and a first part 17a corresponding to the free tapered end 17 of the sealing member as shown in FIG. 5. Between first part 17a and second part 16a the sealing member does not engage the spigot 19 and the same holds for a region of sealing member 3 between second part 16a and third part 23a. In FIGS. 3 and 4 the spigot 19 does not engage the sealing member 3 between first part 20 and second part 21 and the socket does not engage the sealing member between parts 33 and 34 and between parts 34 and 35.

The smallest inner diameter of the sealing member 3 at the inner side 20 is smaller than the inner diameter at the end of the sealing member so that this part will be pressed outwardly by a penetrating spigot.

The tapered lip 5 is very important as no contracting force is observed under hot water conditions due to the smaller stretching force at end 17.

In FIG. 4 the socket 18 comprises two socket parts 18a and 18b, the sealing parts filling the space between first socket part 18a and the outer side of the spigot 19 and the outer diameter of spigot 19 being substantially equal to the inner diameter of socket part 18b.

The other wave valley 29 on the outer side of the sealing member joins on the one hand the lower surface 30 of sealing member 1 and on the other hand the outer surface 31 in a curved way.

In the embodiment of FIG. 5 the lower surface 36 of the first step of the sealing means may be about parallel to the flat surface 22.

What we claim is:

1. An annular sealing member for cylindrical piping spigot and socket couplings in which the sealing member comprises an outer annular retaining member, a sealing part and a connecting part interconnecting the retaining and sealing part, said sealing part extending stepwise continuously radially inwardly of said annular retaining member and extending axially along said member and not exceeding in thickness the portion extending between its free end and its point of attachment to said outer annular retaining member.

2. A sealing member according to claim 1 wherein the sealing member comprises a plurality of steps.

3. A sealing member according to claim 1, wherein the sealing member comprises at least two steps.

4. A sealing member according to claim 1, wherein a first step of the sealing member is substantially situated within the inner side of the retaining part.

5. A sealing member according to claim 1, wherein the retaining part is about perpendicular to the connecting part.

6. A sealing member according to claim 1, wherein the sealing part comprises a bent second junction connecting a first an second step of the sealing member.

7. A sealing member according to claim 1, wherein the sealing member has substantially the same thickness from the junction with the retaining part to the free end of the sealing member.

8. A sealing member according to claim 1, wherein the thickness of the sealing member gradually decreases from the first junction with the retaining part.

9. A sealing member according to claim 1, wherein the thickness of the sealing member gradually decreases from the first junction with the retaining part and the gradually decreasing thickness is continued to the free end of the sealing part.

10. A sealing member according to claim 1, wherein the sealing member consists of rubber.

11. A sealing member according to claim 1, wherein the smallest distance from the inner side of the second step of the sealing part to the axis of the sealing member is smaller than the smallest distance from the axis to the inner side of the adjoining first step of the sealing part.

12. A sealing member according to claim 1, wherein the sealing part has a circular cross-section in the area of the second step which should engage the spigot.

13. A sealing member according to claim 1, wherein the sealing part is provided with a tapered free end.

14. A sealing member according to claim 1, wherein a substantial flat surface extends in cross-section from said tapered end towards a second step.

15. A sealing member according to claim 1, wherein the inner side of second part of the sealing parts comprising said tapered end is curved.

16. A sealing member according to claim 1, wherein annular leakage-preventing ribs are provided on the curved surface of the sealing part or parts engaging a spigot in a pipe coupling.

17. A sealing member according to claim 1, wherein the second sealing part presents the shape of a sickle.

18. A sealing member according to claim 1, wherein the connecting part comprises a wave crest on its side directed to the sealing parts.

19. A sealing member according to claim 1, wherein the connecting part comprises a wave crest on its side directed to the sealing parts and at least one wave valley is situated besides said wave crest.

20. A sealing member according to claim 1, wherein the connecting part comprises a wave crest on its side directed to the sealing parts and at least one wave valley is situated besides said wave crest and at least another wave valley is present on the other side of the connecting part facing said wave crest.

21. A pipe connection comprising a spigot and a socket and an annular sealing member extending between the outer side of the spigot and the inner side of the socket, wherein the sealing member comprises:
 (a) an annular retaining part,
 (b) an annular sealing part,
 (c) an annular connecting part interconnecting said retaining part and sealing part,
 (d) said sealing part extending stepwise within the space bound by the inner circumference of said annular retaining part and an axial extension thereof along the axis of said annular sealing member and at any point between the first junction with said retaining part and the free end of said sealing part,
 (e) the thickness of said sealing part not exceeding the thickness of the part of the sealing member at its junction with said annular retaining part.

22. A pipe connection according to claim 21, wherein the sealing parts extend in a first socket recess.

23. A pipe connection according to claim 21, wherein the sealing parts of the sealing member extend substantially to the end of a first socket recess.

24. A pipe connection according to claim 21, wherein the sealing parts engage the outer side of the spigot at at least two separate spaced positions and the inner side of a socket space at at least two separate spaced positions.

25. A pipe connection according to claim 1, wherein the inner side of a socket space engages the sealing parts at three separate spaced positions.

26. A pipe connection according to claim 21, wherein one of the engaging positions between sealing means and inner side of socket space is situated at the free end of the socket.

27. A pipe connection according to claim 21, wherein the sealing member comprises a plurality of steps.

28. A pipe connection according to claim 21, wherein the sealing member comprises at least two steps.

29. A pipe connection according to claim 21, wherein a first step of the sealing member is substantially situated within the inner side of the retaining part.

30. A pipe connecting according to claim 21, wherein the retaining part is about perpendicular to the connecting part.

31. A pipe connection according to claim 21, wherein the sealing part comprises a bent second junction connecting a first and second step of the sealing member.

32. A pipe connection according to claim 21, wherein the sealing member has substantially the same thickness from the junction with the retaining part to the free end of the sealing member.

33. A pipe connection according to claim 21, wherein the thickness of the sealing member gradually decreases from the first junction with the retaining part.

34. A pipe connection according to claim 21, wherein the thickness of the sealing member gradually decreases from the first junction with the retaining part and the gradually decreasing thickness is continued to the free end of the sealing part.

35. A pipe connection according to claim 21, wherein the sealing member consists of rubber.

36. A pipe connection according to claim 21, wherein the smallest distance from the inner side of the second step of the sealing part to the axis of the sealing member is smaller than the smallest distance from the axis to the inner side of the adjoining first step of the sealing part.

37. A pipe connection according to claim 21, wherein the sealing part has a circular cross-section in the area of the second step which should engage the spigot.

38. A pipe connection according to claim 21, wherein the sealing part is provided with a tapered free end.

39. A pipe connection according to claim 21, wherein a substantial flat surface extends in cross-section from said tapered end towards a second step.

40. A pipe connection according to claim 21, wherein the inner side of second part of the sealing parts comprising said tapered end is curved.

41. A pipe connection according to claim 21, wherein annular leakage-preventing ribs are provided on the curved surface of the sealing part or parts engaging a spigot in a pipe coupling.

42. A pipe connection according to claim 21, wherein the second sealing part presents the shape of a sickle.

43. A pipe connection according to claim 21, wherein the connecting part comprises a wave crest on its side directed to the sealing parts.

44. A pipe connection according to claim 21, wherein the connecting part comprises a wave crest on its side directed to the sealing parts and at least one wave valley is situated besides said wave crest.

45. A pipe connection according to claim 21, wherein the connecting part comprises a wave crest on its side directed to the sealing parts and at least one wave valley is situated besides said wave crest and at least another wave valley is present on the other side of the connecting part facing said wave crest.

46. An annular sealing member for a cylindrical piping system having spigot and socket couplings in which the sealing member comprises an outer annular retaining member, at least two contiguous step-down sealing members extending contiguously from the inner annulus of said annular retaining member radially inwardly, said step-down sealing members extending progressively radially inwardly of said annular sealing retaining member and extending along the axis thereof, said two contiguous step-down sealing members not varying in thickness from their connection with said annular retaining member including the connecting parts between the step-downs.

47. A sealing member for a spigot and socket coupling comprising a retaining part to be maintained by a retaining ring before the front side of a socket, a sealing part and a connecting part interconnecting the retaining and the sealing part, the sealing part extending stepwise 4, 24 within the space bound by the inner circumference of the retaining part and of the extension of said retaining part and at any point between the junction of the sealing part with the retaining part and the free end of the sealing part the thickness of the sealing part does not exceed the thickness of the part extending between said point and said junction and does not exceed the thickness of the sealing part at said junction.

* * * * *